(12) United States Patent
Goddard et al.

(10) Patent No.: US 7,484,535 B2
(45) Date of Patent: Feb. 3, 2009

(54) CORRUGATED PIPE WITH OUTER LAYER

(75) Inventors: James B. Goddard, Powell, OH (US); John Martin Kurdziel, Fort Wayne, IN (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 413 days.

(21) Appl. No.: 11/078,323

(22) Filed: Mar. 14, 2005

(65) Prior Publication Data

US 2006/0201567 A1    Sep. 14, 2006

(51) Int. Cl.
*F16L 11/00* (2006.01)
(52) U.S. Cl. ...................... 138/121; 138/122
(58) Field of Classification Search ............ 138/121, 138/122
See application file for complete search history.

(56) References Cited

U.S. PATENT DOCUMENTS

| | | | |
|---|---|---|---|
| 2,753,596 A | 7/1956 | Bailey | |
| 2,877,150 A | 3/1959 | Wilson | |
| 2,888,954 A | 6/1959 | Gates | |
| 2,931,069 A | 4/1960 | McCormick | |
| 3,379,805 A | 4/1968 | Roberts | |
| 3,490,496 A | 1/1970 | Steams | |
| 3,538,209 A | 11/1970 | Hegler | |
| 3,605,232 A * | 9/1971 | Hines | 29/890.144 |
| 3,677,676 A | 7/1972 | Hegler | |
| 3,725,565 A | 4/1973 | Schmidt | |
| 3,837,364 A * | 9/1974 | Jenner | 464/175 |
| 4,220,181 A | 9/1980 | Nyssen | |
| 4,262,162 A * | 4/1981 | Plinke et al. | 174/15.6 |
| 4,377,545 A | 3/1983 | Hornbeck | |
| 4,415,389 A | 11/1983 | Medford et al. | |
| 4,492,551 A | 1/1985 | Hegler et al. | |
| 4,523,613 A | 6/1985 | Fouss et al. | |
| 4,588,546 A | 5/1986 | Feil et al. | |
| 4,756,339 A | 7/1988 | Buluschek | |
| 4,779,651 A * | 10/1988 | Hegler et al. | 138/109 |
| 4,854,416 A * | 8/1989 | Lalikos et al. | 181/207 |
| 4,862,924 A * | 9/1989 | Kanao | 138/144 |
| 4,900,503 A | 2/1990 | Hegler et al. | |

(Continued)

FOREIGN PATENT DOCUMENTS

DE    1 278 734    9/1968

(Continued)

OTHER PUBLICATIONS

Foerst, Dr. Wilhelm, Ullmanns Encyklopädie der technischen Chemla, Urban & Schwarzenberg, Munchen, Berlin, Germany, pp. 52-53, 71-73, 1960.

*Primary Examiner*—James F Hook
(74) *Attorney, Agent, or Firm*—Finnegan, Henderson, Farabow, Garrett & Dunner L.L.P.

(57) ABSTRACT

A pipe having an axially extending bore is defined by a pipe wall including a corrugated outer wall having axially adjacent annular outwardly-extending crests separated by valleys. The pipe wall also includes a non-linear outer layer having adjacent concave portions and convex portions. The concave portions are aligned with the corrugation crests of the outer wall so that the convex portion of the outer layer extends outwardly between at least two corrugation crests to provide improved resistance to deformation.

19 Claims, 4 Drawing Sheets

U.S. PATENT DOCUMENTS

| | | | |
|---|---|---|---|
| 4,906,496 | A | 3/1990 | Hosono et al. |
| 4,970,351 | A | 11/1990 | Kirlin |
| 5,058,934 | A * | 10/1991 | Brannon ..................... 285/226 |
| 5,145,545 | A | 9/1992 | Winter et al. |
| 5,156,901 | A | 10/1992 | Tanaka |
| 5,256,233 | A | 10/1993 | Winter et al. |
| 5,330,600 | A | 7/1994 | Lupke |
| 5,346,384 | A | 9/1994 | Hegler et al. |
| 5,391,334 | A | 2/1995 | Enomoto |
| 5,441,083 | A | 8/1995 | Korsgaard |
| 5,460,771 | A | 10/1995 | Mitchell et al. |
| 5,469,892 | A | 11/1995 | Noone et al. |
| 5,706,864 | A | 1/1998 | Pfleger |
| 5,901,754 | A | 5/1999 | Elsässer et al. |
| 5,975,143 | A | 11/1999 | Järvenkytä et al. |
| 5,976,298 | A | 11/1999 | Hegler et al. |
| 6,000,434 | A * | 12/1999 | Winter et al. ............... 138/121 |
| 6,016,848 | A | 1/2000 | Egres, Jr. |
| 6,062,268 | A | 5/2000 | Elsässer et al. |
| 6,186,182 | B1 * | 2/2001 | Yoon ......................... 138/122 |
| 6,199,592 | B1 * | 3/2001 | Siferd et al. ................. 138/109 |
| 6,240,969 | B1 | 6/2001 | Wildermuth |
| 6,335,101 | B1 | 1/2002 | Haeger et al. |
| 6,399,002 | B1 | 6/2002 | Lupke et al. |
| 6,461,078 | B1 | 10/2002 | Presby |
| 6,491,994 | B1 | 12/2002 | Kito et al. |
| 6,555,243 | B2 | 4/2003 | Flepp et al. |
| 6,591,871 | B2 | 7/2003 | Smith et al. |
| 6,607,010 | B1 * | 8/2003 | Kashy ........................ 138/121 |
| 6,631,741 | B2 | 10/2003 | Katayama et al. |
| 6,645,410 | B2 | 11/2003 | Thompson |
| 6,787,092 | B2 | 9/2004 | Chan et al. |
| 6,848,478 | B2 | 2/2005 | Nagai |
| 6,933,028 | B2 | 8/2005 | Milhas |
| 6,935,378 | B2 | 8/2005 | Ikemoto et al. |
| 6,955,780 | B2 | 10/2005 | Herrington |
| 7,156,128 | B1 * | 1/2007 | Kanao ........................ 138/133 |
| 2002/0179232 | A1 | 12/2002 | Thompson |
| 2004/0241368 | A1 | 12/2004 | Iwata et al. |

FOREIGN PATENT DOCUMENTS

| | | |
|---|---|---|
| DE | 1 704 718 | 7/1971 |
| DE | 2 042 031 | 5/1972 |
| DE | 2 413 878 | 2/1976 |
| DE | 2 403 618 | 12/1980 |
| DE | 2 804 540 C2 | 1/1984 |
| EP | 0 096 957 B1 | 5/1989 |
| EP | 0 385 465 A2 | 3/1990 |
| EP | 0 385 465 B1 | 3/1990 |
| EP | 0 581 064 A1 | 7/1993 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1 148 277 | 4/1969 |
| JP | 59 026224 | 2/1984 |
| JP | 06 64062 | 3/1994 |
| JP | 08 267128 | 10/1996 |
| WO | WO 85/00140 | 1/1985 |
| WO | WO 2004/094888 A1 | 11/2004 |

* cited by examiner

CORRUGATED PIPE WITH OUTER LAYER

TECHNICAL FIELD

This invention relates generally to corrugated pipe having an additional outer layer, and more particularly, to such a corrugated pipe for use in the drainage of soil and transportation of surface water by gravity.

BACKGROUND

Corrugated pipe that is commonly used for drainage of soil and transportation of surface water typically has a profile with sides of the corrugation that are fairly steep and a top or crest of the corrugation that is fairly flat.

There are two basic ways that pipe can fail in use: by deforming excessively or by fracturing. Stiffer material is less likely to deform but more likely to fracture under stress. Flexible material is more likely to deform but less likely to fracture under stress. Deformation is expressed as a ratio of elongation of the material to its original material length and is called "strain." Stress causes the deformation that produces strain. The modulus, or stiffness, of a plastic is the ratio of stress divided by strain, or the amount of stress required to produce a given strain.

There are a number of ways to provide lower deformation of a pipe in use: (1) increasing pipe stiffness by using a stiffer material; (2) thickening the pipe walls; or (3) changing the wall design to increase the moment of inertia, which increases the overall stiffness of the pipe wall. Using stiffer material to make a corrugated plastic pipe is disadvantageous because the pipe must be able to deflect under load to a certain degree without cracking or buckling. A certain amount of elasticity is therefore beneficial in preventing brittle failures upon deflection.

Thickening the pipe walls is also disadvantageous because it adds material cost and increases weight to the pipe which increases shipping and handling costs. Thus, it is advantageous to find a wall design that increases the moment of inertia of the pipe, while causing a minimal increase to the weight of the pipe or the stiffness of the material used to make the pipe.

Increasing the moment of inertia of a pipe wall increases its resistance to bending. One example of a wall design that increases the moment of inertia, and therefore the stiffness, of a plastic corrugated pipe with minimal increase in pipe weight and material stiffness is illustrated in U.S. Pat. No. 6,644,357 to Goddard. In this pipe, the ratio of height of a corrugation to the width of that corrugation is less than 0.8:1.0, and the sidewall of the corrugation is inclined, with respect to the pipe's inner wall, in the range of 75-80°. This ratio allows the pipe to deflect to greater than 30% of its original diameter without exhibiting imperfections associated with structural failure.

Pipe failure can be prevented by minimizing the maximum force exerted on the pipe walls during the bending associated with deformation. If a sheet of material, such as plastic, is flexed, the outside of the resulting curve is deformed in tension, and the inside of the curve is deformed in compression. Somewhere near the middle of a solid sheet is a neutral plane called the centroid of the sheet. In the case of corrugated pipe, the "sheet" thickness comprises corrugations to achieve economy of material. Because the "sheet" is therefore not solid, the centroid may not be in the middle of the sheet, but rather is located at the center of the radius of gyration of the mass (i.e., the centroid is displaced toward the location of greater mass). The more offset the centroid is from the middle of the sheet thickness, the greater the maximum force will be at the surface farthest from the centroid during bending or flexure from deformation due to a longer moment arm for certain acting forces. Thus, to lower the maximum force caused by pipe wall deformation, the pipe should be designed so that the centroid is closer to the middle of the sheet thickness. The closer the centroid is to the middle of the sheet thickness, the more desirably uniform the stress distribution will be and the maximum stress upon deformation will be minimized to prevent pipe failure due to a shorter moment arms for acting forces.

FIG. 1 illustrates a vertical cross section on an enlarged scale of a sidewall section of one type of prior art double-wall corrugated pipe. The section includes a smooth inner wall 100 and a corrugated outer wall 110. The corrugated outer wall includes corrugation crests 120 and corrugation valleys 130.

In use, it is the deflection and integrity of inner wall 100 that is critical to pipe performance. Deflection of the outer wall 110 is greater than deflection of the inner wall 100 in use, but a certain amount of deflection of the outer corrugated wall 110 is acceptable because, although maintaining the integrity of the outer wall is advantageous, its integrity can be sacrificed to a certain extent without affecting pipe performance, as long as the integrity of the inner wall 100 is maintained. Thus, it is advantageous to provide some flexibility in the outer wall so that it can deflect in use without that deflection translating to the inner wall.

When a pipe is installed in a trench, the hole into which the pipe is placed must be backfilled, for example with the excavated soil. One problem that has been experienced with known corrugated pipe, is that the haunch areas of the ditch are not properly backfilled due to the extremely non-linear outer surface of the corrugated pipe. The excavated material, such as soil, cannot easily pass by the corrugated outer profile of the installed pipe to reach and fill the haunch areas. The effect of this is illustrated in prior art FIGS. 2A and 2B, which show the possible deformation that occurs in an installed pipe after the trench is backfilled. As can be seen, the pipe P does not fill the entire trench area, leaving haunches H between the pipe P and the soil S. When the trench is backfilled, forces on the top of the pipe from the load of the backfill will tend to cause deformation of the pipe, as may the pipe's tendency to settle into the unfilled haunch areas.

It would be beneficial to provide a pipe with an exterior surface that is smoother (less non-linear) so the backfill can more easily reach and fill the haunch areas of the trench, thus limiting or prohibiting sagging of the pipe into unfilled haunch areas.

It would also be beneficial to provide alternative wall designs that increase the moment of inertia of a plastic corrugated pipe so the pipe experiences less deformation in use.

SUMMARY OF THE INVENTION

The objects and advantages of the invention may be realized and attained by means of features and combinations particularly pointed out in the appended claims.

In accordance with a preferred embodiment, the invention includes a pipe having an axially extending bore defined by a pipe wall including a corrugated outer wall having axially adjacent annular outwardly-extending crests separated by valleys. The pipe wall also includes a non-linear outer layer having adjacent concave portions and convex portions. The concave portions are aligned with the corrugation crests of the outer wall so that the convex portion of the outer layer extends outwardly between at least two corrugation crests to provide improved resistance to deformation.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENTS

Reference will now be made in detail to the presently preferred embodiments of the invention, examples of which are illustrated in the accompanying drawings.

Figure 1:
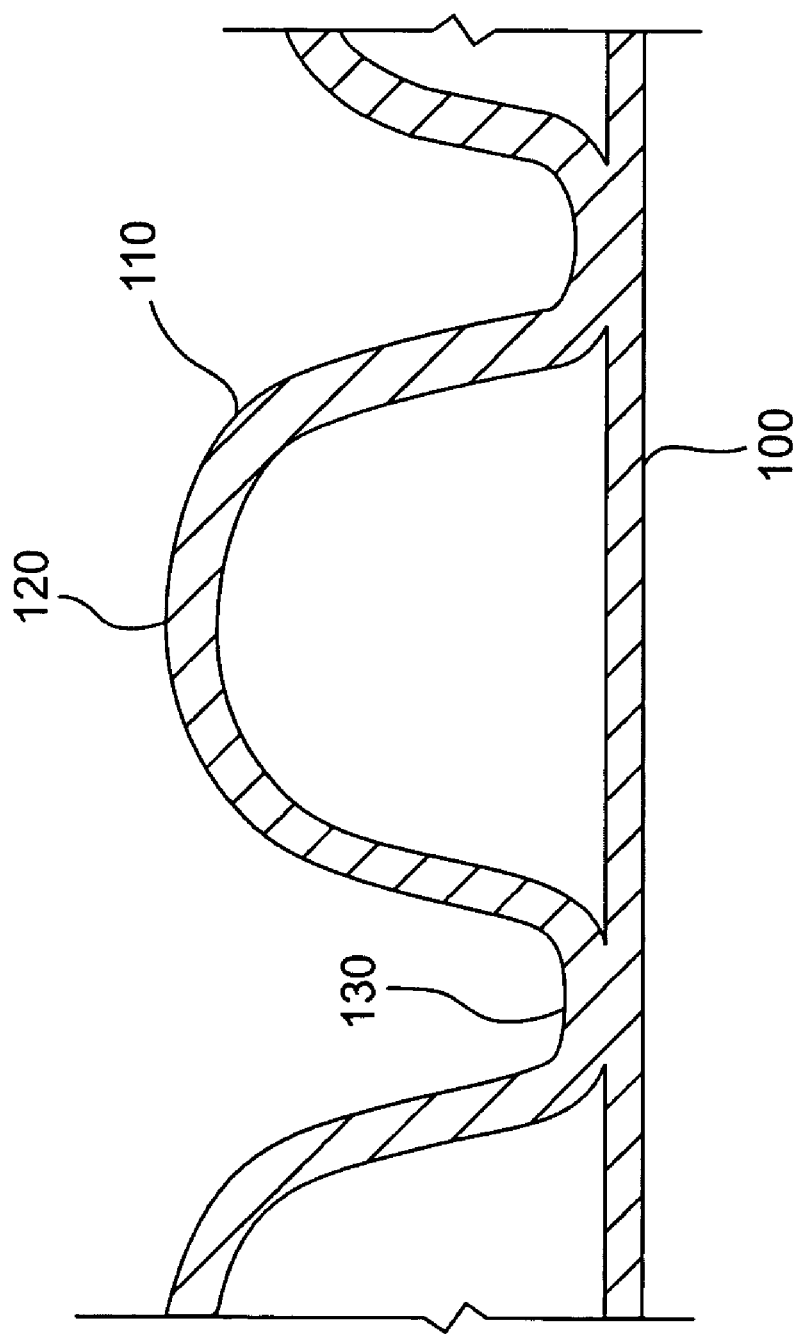
FIG. 1 illustrates a cross section of a sidewall section of one type of prior art double-wall corrugated pipe.
Figure 2A:
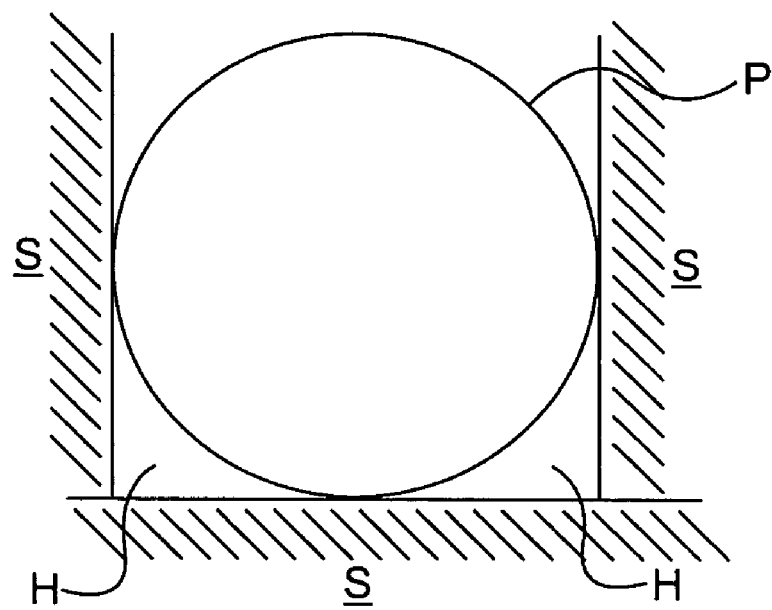
FIG. 2A schematically illustrates a pipe installed in a trench prior to backfilling.
Figure 2B:
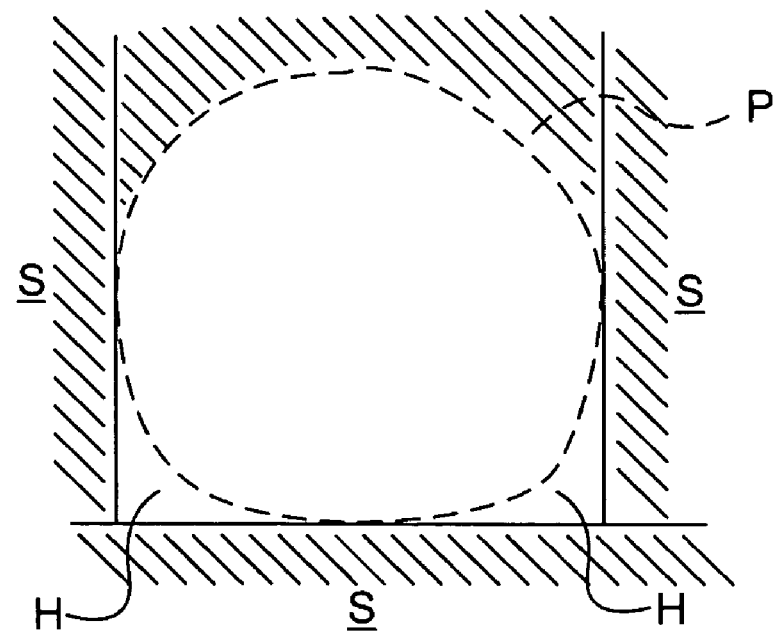
FIG. 2B schematically illustrates a pipe installed in a trench after backfilling.
Figure 3:
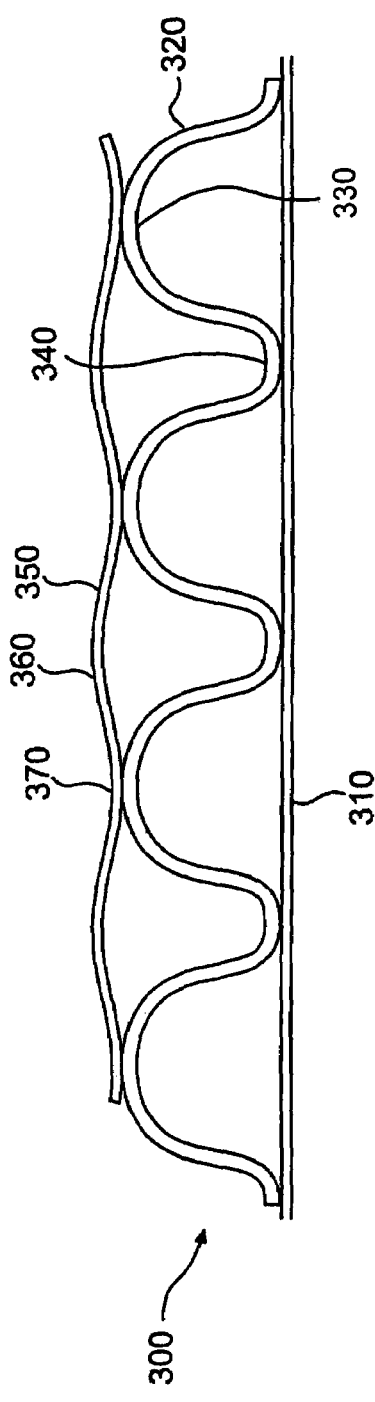
FIG. 3 illustrates a cross section of a sidewall section of an embodiment of a pipe of the present invention.

FIG. 3 illustrates a cross section of a sidewall of an exemplary embodiment of the present invention. The section of pipe wall 300 preferably includes a smooth inner wall 310 and a corrugated outer wall 320. The inner wall 310 has a smooth interior surface to improve hydraulics. The corrugated outer wall 320 provides a high strength-to-weight ratio.

The corrugated outer wall 320 includes corrugation crests 330 and corrugation valleys 340. On top of the corrugated outer wall 320 is an outer layer 350 of the pipe wall 300 that includes convex sections 360 and concave sections 370. The concave sections 370 of the outer layer 350 are generally aligned with the crests 330 of the corrugations. The convex sections 360 extend outwardly between adjacent crests 330 of the outer wall 320.

Two exemplary dimensional scenarios of this embodiment will now be discussed. For an eighteen inch corrugated pipe, an exemplary embodiment would include an inner wall 310 having a thickness of about 0.052 inches and an outer wall 320 having a thickness of about 0.08 inches to about 0.09 inches. The thickness of the walls may not be completely uniform. The thickness of the outer layer 350 is about 0.052 inches. The distance between the midpoint of adjacent corrugation valleys 340 is about 2.617 inches. The distance between the top of the thickness that forms the corrugation valley 340 and the top of the thickness that forms the corrugation crest 330 is about 1.3566 inches. The distance between the peak of a convex section 360 of the outer layer 350 and the peak of a concave section 370 of the outer layer 350 is about 0.25 inches. The thickness of the outer layer may not be completely uniform.

For a forty-two inch corrugated pipe, an exemplary embodiment would include an inner wall 310 having a thickness of about 0.111 inches and an outer wall 320 having a thickness of about 0.15 inches to about 0.16 inches. The thickness of the walls may not be completely uniform. The thickness of the outer layer 350 is about 0.1123 inches. The distance between the midpoint of adjacent corrugation valleys 340 is about 5.1383 inches. The distance between the top of the thickness that forms the corrugation valley 340 and the top of the thickness that forms the corrugation crest 330 is about 2.9025 inches. The distance between the peak of a convex section 360 of the outer layer 350 and the peak of a concave section 370 of the outer layer 350 ("Outer Layer Corrugation Height") is about 0.25 inches. The thickness of the outer layer may not be completely uniform.

The following chart provides some exemplary dimensions of a greater variety of pipe sizes:

| Pipe Diameter (inside bore) | Pipe Diameter (exterior) | Inner Wall (310, 410) Thickness | Outer Layer (350, 450) Thickness | Outer Layer (350, 450) Corrugation Height |
|---|---|---|---|---|
| 12" | 14.59" | 0.035" | 0.040" | 0.100" |
| 15" | 17.76" | 0.039" | 0.045" | 0.133" |
| 18" | 21.38" | 0.051" | 0.050" | 0.133" |
| 24" | 28.03" | 0.059" | 0.075" | 0.160" |
| 30" | 35.40" | 0.059" | 0.080" | 0.213" |
| 36" | 42.05" | 0.067" | 0.090" | 0.267" |
| 42" | 48.06" | 0.709" | 0.095" | 0.267" |
| 48" | 53.98" | 0.709" | 0.110" | 0.267" |
| 60" | 67.43" | 0.078" | 0.130" | 0.305" |

It is to be understood that these pipe dimensions are merely exemplary, and that the present invention contemplates pipe having a wide variety of dimensions.

Figure 4:
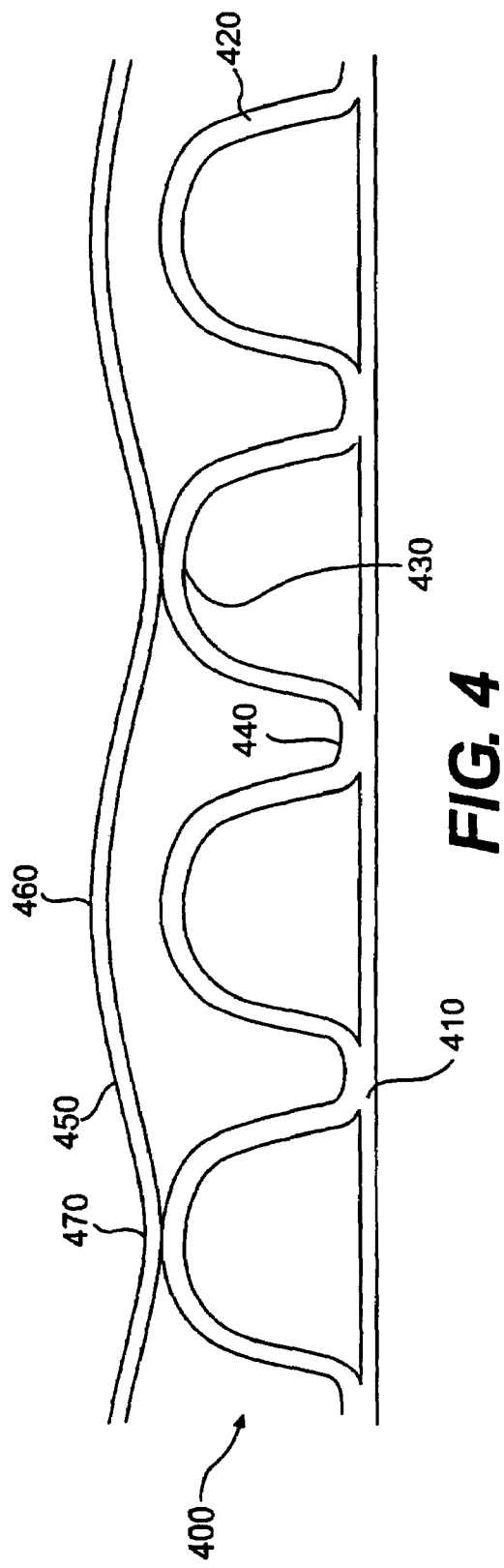
FIG. 4 illustrates a vertical cross section of a sidewall section of another embodiment of a pipe of the present invention.

FIG. 4 illustrates a cross section of a sidewall section of another exemplary embodiment of the present invention. Similar to the previous embodiment, the section of pipe wall 400 preferably includes a smooth inner wall 410 and a corrugated outer wall 420. The corrugated outer wall 420 includes corrugation crests 430 and corrugation valleys 440. On top of the corrugated outer wall 420 is an outer layer 450 of the pipe wall 400 that includes convex sections 460 and concave sections 470. The concave sections 470 of the outer layer 450 are generally aligned not with adjacent corrugation crests as in the previous embodiment, but rather with every other corrugation crest 430. Indeed, the present invention contemplates the convex portion of the outer layer spanning any number of corrugation crests.

The pipe dimensions of the embodiment illustrated in FIG. 4 may be similar to, or the same as, the dimensions set forth above.

The corrugated pipe of the present invention achieves reduced installation sensitivity due to an increased moment of inertia (i.e., stiffness) of the pipe wall that translates into increased resistance to deformation bending. In addition, because the outer layer 350, 450 is smoother or less non-linear than the corrugated outer wall, it promotes backfill filling the haunch areas of the trench.

The outer layer 350, 450 of the present invention decreases the amount of pipe wall deformation and improves pipe performance by increasing the pipe stiffness without thickening the pipe walls or using a stiffer material for the pipe walls. One way the outer layer 350, 450 accomplishes this is by moving the centroid (or radius of gyration) of the pipe wall 300, 400 closer to the midpoint of the wall thickness. This provides a more uniform stress distribution and therefore a lower maximum stress during any deformation bending.

Just as the corrugation of known corrugated pipe can be a sacrificial layer that can deflect to a certain extent to accommodate forces exhibited on the pipe in use, the outer layer 350, 450 of the present invention provides yet another sacrificial layer. Thus there are two layers that can deflect to accommodate forces exhibited on the pipe in use to prevent those forces from deforming the inner wall of the pipe.

In addition, having an arched outer layer 350, 450 atop the corrugated outer wall 320, 420 provides a series of strong and stable arches supporting the smooth inner wall.

The shape of the outer layer increases the soil bearing area of the pipe exterior, which is advantageous because the load on the pipe created by backfill is spread out over a greater exterior area of the pipe, thus reducing the load per square inch on the pipe exterior, which reduces the maximum forces on the pipe from the backfill load.

Figure 5A:
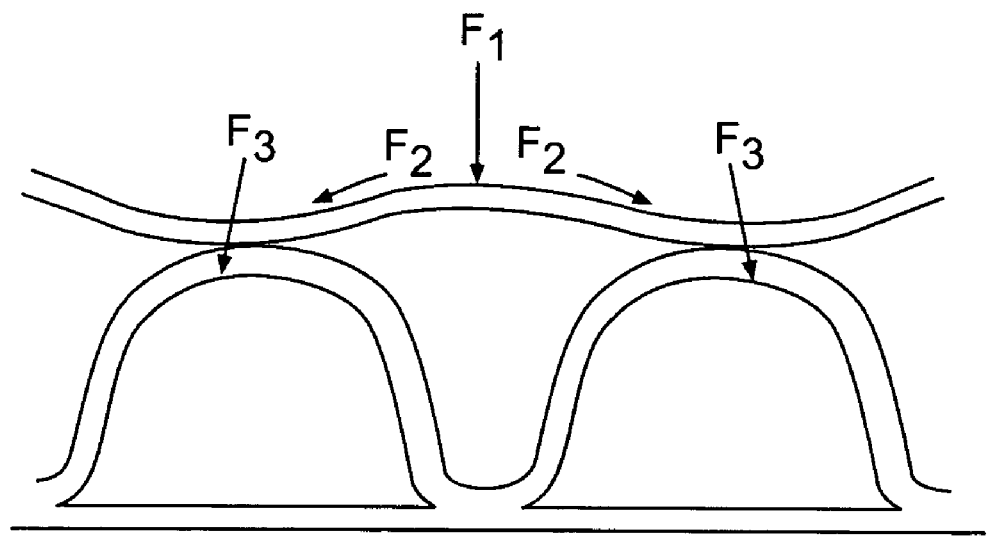
FIG. 5A illustrates load transfer throughout the pipe wall during use of an installed pipe of the present invention.

As illustrated in FIG. 5A, the arrangement and shape of the outer layer provides superior load transfer throughout the pipe wall because it provides a more uniform stress distribution and makes the loads exerted on the outer wall closer to pure compression. For example, an installed pipe will experience a load $F_1$ exerted on the convex portion of the outer layer. This load will be distributed as forces $F_2$ to the adjacent corrugations of the outer wall and become substantially entirely compressive forces $F_3$ on the crests of those corrugations.

Figure 5B:
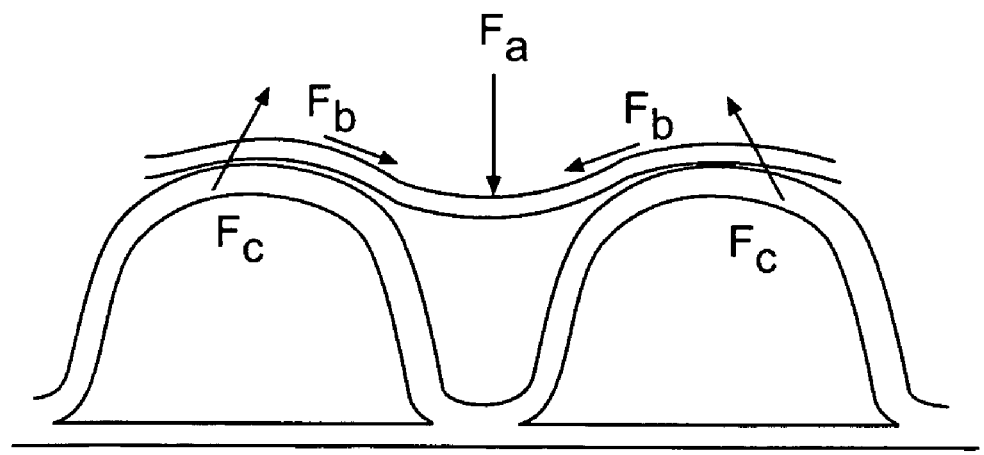
FIG. 5B illustrates load transfer throughout the wall of a prior art pipe during use.

This force distribution can be distinguished from prior art pipes having outer layers with their convex portions aligned with the outer wall corrugation crests, as illustrated in FIG. 5B. In these prior art pipes, an installed pipe will experience a load $F_a$ exerted on the convex portion of the outer layer. This load will be distributed as forces $F_b$ to the adjacent corrugations of the outer wall and become substantially entirely tensile forces $F_c$ on the crests of those corrugations.

An advantage of the present invention is that the outer layer can be applied to or extruded with existing corrugated pipe, so that there is no need to redesign the existing double-walled corrugated pipe.

The outer layer 350, 450 is preferably fused to the corrugated outer wall 320, 420 where the concave sections 370, 470 of the outer layer 350, 450 meet the crests 330, 430 of the corrugated out wall 320, 420. The inner and outer walls are also preferably fused together as is common in the prior art. Fusing of the inner wall to the outer wall is accomplished by extruding the outer wall onto the inner wall while the inner wall is still hot. Fusing of the outer layer to the outer wall is accomplished in the same way—by extruding the outer layer onto the outer wall while the outer wall is still hot.

The layers of pipe may alternatively be co-extruded or adhered to each other with a suitable adhesive after extrusion. The present invention contemplates a variety of methods of creating a pipe with outer layer 350, for example strapping the outer layer to the outer wall of the corrugated pipe.

In a preferred embodiment of the invention, the inner wall 310, 410, outer wall 320, 420, and outer layer 350, 450 of the pipe comprise a plastic such as high density polyethylene (HDPE) or polypropylene (PP). The pipe may alternatively comprise a variety of other materials including, for example, other plastics, metals, or composite materials. The inner wall 310, 410, outer wall 320, 420, and outer layer 350, 450 of the pipe could be comprised of different, but compatible, materials It will be apparent to those skilled in the art that various modifications and variations can be made in the gasket of the present invention and in construction of this gasket without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pipe having an axially extending bore defined by a smooth inner wall fused to a corrugated outer wall having axially adjacent, annular, outwardly-extending corrugation crests separated by corrugation valleys, each corrugation crest having a circumference; wherein the pipe further includes an outer layer fused to the outer wall, the outer layer having adjacent concave portions separated by convex portions, each concave portion being aligned with a corrugation crest of the outer wall around the circumference of the corrugation crest, so that each convex portion of the outer layer extends outwardly across one corrugation valley and between two adjacent corrugation crests.

2. The pipe of claim 1, wherein the outer wall and the outer layer comprise plastic.

3. The pipe of claim 1, wherein the outer wall and the outer layer comprise high density polyethylene.

4. The pipe of claim 1, wherein the outer wall and the outer layer comprise polypropylene.

5. The pipe of claim 1, wherein the outer wall and the outer layer are coextruded.

6. The pipe of claim 1, wherein the outer wall and the outer layer are adhered to each other with an adhesive.

7. The pipe of claim 1, wherein the outer wall and the outer layer are fused by extruding the outer layer onto the outer wall while the outer wall is still hot.

8. The pipe of claim 1, wherein the outer wall and the outer layer are attached to each other using a strap.

9. The pipe of claim 1, wherein a distance between midpoints of adjacent corrugation valleys is about 2.617 inches.

10. The pipe of claim 1, wherein a distance between midpoints of adjacent corrugation valleys is about 5.1383 inches.

11. The pipe of claim 1, wherein a distance between a top of a corrugation valley and a top of a corrugation crest is about 1.3566 inches.

12. The pipe of claim 1, wherein a distance between a top of a corrugation valley and a top of a corrugation crest is about 2.9025 inches.

13. The pipe of claim 1, wherein a distance between a peak of a convex portion of the outer layer and a peak of a concave portion of the outer layer is about 0.133 inches.

14. The pipe of claim 1, wherein a distance between a peak of a convex portion of the outer layer and a peak of a concave portion of the outer layer is about 0.25 inches.

15. The pipe of claim 1, wherein the outer wall and outer layer comprise materials selected from a group of materials including metals and composites.

16. The method of claim 13, wherein fixing the outer layer to the outer wall comprises adhering the outer layer to the outer wall.

17. The method of claim 13, wherein fixing the outer layer to the outer wall comprises coextruding the outer layer and the outer wall.

18. The method of claim 13, wherein fixing the outer layer to the outer wall comprises extruding the outer layer onto the outer wall while the outer wall is still hot.

19. The method of claim 16, wherein fixing the outer layer to the outer wall comprises adhering the outer layer to the outer wall.

\* \* \* \* \*

UNITED STATES PATENT AND TRADEMARK OFFICE
CERTIFICATE OF CORRECTION

PATENT NO. : 7,484,535 B2  
APPLICATION NO. : 11/078323  
DATED : February 3, 2009  
INVENTOR(S) : James B. Goddard et al.

It is certified that error appears in the above-identified patent and that said Letters Patent is hereby corrected as shown below:

Delete claim 16, column 6, lines 53-55, in its entirety and substitute therefor:
--16. A method of improving the resistance to deformation of a corrugated pipe having a smooth inner wall fused to an outer wall defined by annular corrugation crests and corrugation valleys, each corrugation crest having a circumference, the method comprising:
fixing an outer layer to the outer wall, the outer layer having adjacent annular concave portions separated by convex portions, each annular concave portion being aligned with a corrugation crest of the outer wall around the circumference of the corrugation crest, so that each convex portion of the outer layer extends outwardly across one corrugation valley and between two adjacent corrugation crests.--.

In claim 17, column 6, line 56, "claim 13," should read --claim 16,--.

In claim 18, column 6, line 59, "claim 13," should read --claim 16,--.

Signed and Sealed this

Eighth Day of September, 2009

David J. Kappos  
*Director of the United States Patent and Trademark Office*